US010408641B2

(12) United States Patent
Gaude

(10) Patent No.: US 10,408,641 B2
(45) Date of Patent: Sep. 10, 2019

(54) MEASUREMENT SYSTEM

(71) Applicant: CAMERON INTERNATIONAL CORPORATION, Houston, TX (US)

(72) Inventor: Edward C. Gaude, Houston, TX (US)

(73) Assignee: Cameron International Corporation, Houston, TX (US)

( * ) Notice: Subject to any disclaimer, the term of this patent is extended or adjusted under 35 U.S.C. 154(b) by 1054 days.

(21) Appl. No.: 14/528,886

(22) Filed: Oct. 30, 2014

(65) Prior Publication Data

US 2016/0123785 A1 May 5, 2016

(51) Int. Cl.
| | | |
|---|---|---|
| *E21B 33/064* | (2006.01) | |
| *F15B 1/24* | (2006.01) | |
| *G01D 5/20* | (2006.01) | |
| *E21B 33/035* | (2006.01) | |
| *E21B 17/01* | (2006.01) | |
| *G01F 22/00* | (2006.01) | |
| *G01D 5/22* | (2006.01) | |

(52) U.S. Cl.
CPC ............ *G01D 5/204* (2013.01); *E21B 17/01* (2013.01); *E21B 33/0355* (2013.01); *E21B 33/064* (2013.01); *F15B 1/24* (2013.01); *G01D 5/2291* (2013.01); *G01F 22/00* (2013.01); *F15B 2201/31* (2013.01); *F15B 2201/3153* (2013.01); *F15B 2201/405* (2013.01); *F15B 2201/4053* (2013.01); *F15B 2201/515* (2013.01)

(58) Field of Classification Search
None
See application file for complete search history.

(56) References Cited

U.S. PATENT DOCUMENTS

| | | | | |
|---|---|---|---|---|
| 4,982,156 A | * | 1/1991 | Lewis ................. | G01D 5/2216 324/207.18 |
| 5,024,250 A | * | 6/1991 | Nakamura .............. | F15B 1/08 138/104 |
| 5,159,828 A | | 11/1992 | Steiger et al. | |
| 7,514,919 B2 | * | 4/2009 | James ................... | G01D 5/204 324/207.17 |
| 7,868,609 B2 | * | 1/2011 | Zhitomirskiy ......... | G01D 5/204 324/207.17 |

(Continued)

FOREIGN PATENT DOCUMENTS

WO    2010017200    2/2010

OTHER PUBLICATIONS

International Search Report and Written Opinion of PCT Application No. PCT/US2015/051428 dated Dec. 31, 2015: pp. 1-17.

*Primary Examiner* — Jill E Culler
(74) *Attorney, Agent, or Firm* — Helene Raybaud

(57) ABSTRACT

A system for determining the location of a movable element within a container is provided in which a linear variable differential transformer ("LVDT") is formed with the container and the movable element therein. The LVDT includes a coil assembly including a primary or excitation winding, a secondary or output winding, and a movable element or core that is magnetically permeable. Measurement of an output signals allows for precise determination of the movable element location relative to the container. The system can be utilized to determine fluid volumes in accumulators used for controlling subsea equipment by monitoring the location of a movable element, e.g., a piston, within a hydraulic fluid accumulator.

28 Claims, 6 Drawing Sheets

(56) References Cited

U.S. PATENT DOCUMENTS

| | | | |
|---|---|---|---|
| 8,710,827 B2* | 4/2014 | Zhitomirsky | G01D 5/204 |
| | | | 324/207.17 |
| 2003/0090263 A1 | 5/2003 | Heinrich et al. | |
| 2012/0000646 A1 | 1/2012 | Liotta et al. | |
| 2012/0279720 A1 | 11/2012 | Whitby et al. | |
| 2014/0060688 A1 | 3/2014 | Jirgal et al. | |
| 2014/0123746 A1 | 5/2014 | Jaffrey et al. | |

* cited by examiner

MEASUREMENT SYSTEM

BACKGROUND

In most offshore drilling operations, a wellhead at the sea floor is positioned at the upper end of the subterranean wellbore lined with casing. A blowout preventer ("BOP") stack is mounted to the wellhead, and a lower marine riser package ("LMRP") is mounted to the BOP stack. The LMRP is connected to a drilling vessel located at the sea surface via a drilling riser that, in some cases, may be thousands of feet long. The drilling riser provides a conduit to extend a drill string from the surface vessel into the LMRP, the BOP stack, the wellhead and, ultimately, the wellbore. To accommodate movement of the vessel, LMRPs typically include a flex joint coupled to the lower end of the drilling riser.

During drilling operations, drilling fluid, or mud, is pumped from the sea surface down the drill string and into the wellbore. The mud is circulated back to the surface in the annulus between the drill string and drilling riser. The mud facilitates drilling operations and provides a barrier against undesired formation-fluid release into the environment. In the event of a rapid invasion of formation fluid into the wellbore, commonly known as a "kick," the BOP stack and/or LMRP may help seal wellbore and control the kick. In particular, the BOP stack typically includes closure members designed to help seal the wellbore and prevent the release of high-pressure formation fluids from the wellbore. Thus, the BOP stack functions as a pressure control device.

In many subsea drilling operations, hydraulic fluid for operating the BOP stack and the LMRP is provided using a hydraulic fluid supply physically located on the surface drilling vessel. However, access to that supply may be lost, reducing the operability of the BOP stack. As a backup, or even possibly a primary means of operation, hydraulic fluid accumulators—located at the sea surface or subsea—are filled with pressurized hydraulic fluid. The amount and size of the accumulators depends on the anticipated operation specifications for the well equipment and the depth at which such equipment or accumulators will be located.

One common type of accumulator is a piston accumulator. As the name suggests, a piston accumulator has a movable piston that separates a charged-gas section filled with an inert gas (e.g., nitrogen) and a hydraulic-fluid section filed with hydraulic fluid. The charged gas is pressurized and, thus, acts as a spring against the piston to maintain the hydraulic fluid under pressure. The fluid section is connected to a hydraulic circuit so that the hydraulic fluid may be used to operate the well equipment. As the fluid is discharged, the piston moves within the accumulator under pressure from the gas to maintain pressure on the remaining hydraulic fluid until full discharge. Thus, as fluid is discharged, the piston moves, making the gas section larger and the fluid section smaller.

The ability of the accumulator to operate a piece of equipment depends on the amount of hydraulic fluid in the accumulator and the pressure of the charged gas. Thus, it is beneficial to know the volume of the hydraulic fluid remaining in an accumulator so that control of the well equipment may be managed. Measuring the volume of hydraulic fluid in the accumulator over time can also help identify if there is a leak in the accumulator or hydraulic circuit or on the gas side of the piston.

Currently, the ability of an accumulator to power equipment is estimated by measuring the pressure in the hydraulic circuit downstream of the accumulator. However, pressure is not a complete indicator of the overall capacity of an accumulator to operate equipment, because the volume of hydraulic fluid remaining in the accumulator is not known. That is, the accumulator may have hydraulic fluid under sufficient pressure but not enough fluid to effectuate actuation of the system. Also, accumulators are typically arranged in banks of multiple accumulators all connected to a common hydraulic circuit, therefore, the downstream pressure measurement is only an indication of the overall pressure in the bank, not per individual accumulator.

A possible way of determining the volume of hydraulic fluid remaining in the accumulator is to use a linear position sensor such as a cable-extension transducer or linear potentiometer that attaches inside the accumulator to measure the movement of the internal piston. However, these electrical components may fail and because the discharge of hydraulic fluid may be abrupt, the sensors may not be able to sample fast enough to obtain an accurate measurement.

Another method of determining the volume of hydraulic fluid is through the use of physical position indicators that extend from the accumulator. These indicators only offer visual feedback though and are insufficient for remote monitoring and pose a significant challenge to maintaining the integrity of the necessary mechanical seals under full operating pressures.

Through-the-wall sensors (e.g., Hall effect sensors) have also been considered. However, the thickness and specifications of an accumulator wall is such that these types of sensors are not always able to penetrate the material.

SUMMARY

In accordance with certain embodiments of the invention, a system for determining the location of a movable element within a container is provided, this system provides a linear variable differential transformer (LVDT) formed with the container and the movable element therein.

The exemplary measurement system includes a coil assembly including a primary or excitation winding, a pair of secondary or output windings (each wound differentially) coupled in series, and a movable element or core that is magnetically permeable. The excitation and output windings can be disposed in the interior of the container, in the walls of the container, on the exterior of the container, or proximate to but not in physical contact with the container.

When the excitation winding is electrically excited by an excitation signal supplied from an excitation source, such as by a constant amplitude alternating current source, the output winding is inductively coupled to the excitation winding and produces an output signals that is based on the position of the movable core. A controller is configured to receive the output signals and produce a measurement signal. The measurement signal is indicative of the movable element's location relative to the container.

In commercial embodiments, the invention can be utilized to determine fluid volumes in accumulators used for controlling subsea equipment by monitoring the location of a movable element within the accumulator, e.g., a piston, within a hydraulic fluid accumulator. This invention overcomes prior art systems because, among other reasons, it enables remote monitoring, maintains system integrity, and functions irrespective of the container wall thickness.

This summary is provided to introduce a selection of concepts that are further described below in the detailed description. This summary is not intended to identify key or essential features of the claimed subject matter, nor is it intended to be used as an aid in limiting the scope of the claimed subject matter.

DRAWINGS

For a detailed description of the preferred embodiments of the invention, reference will now be made to the accompanying drawings in which.

DETAILED DESCRIPTION

Figure 1:
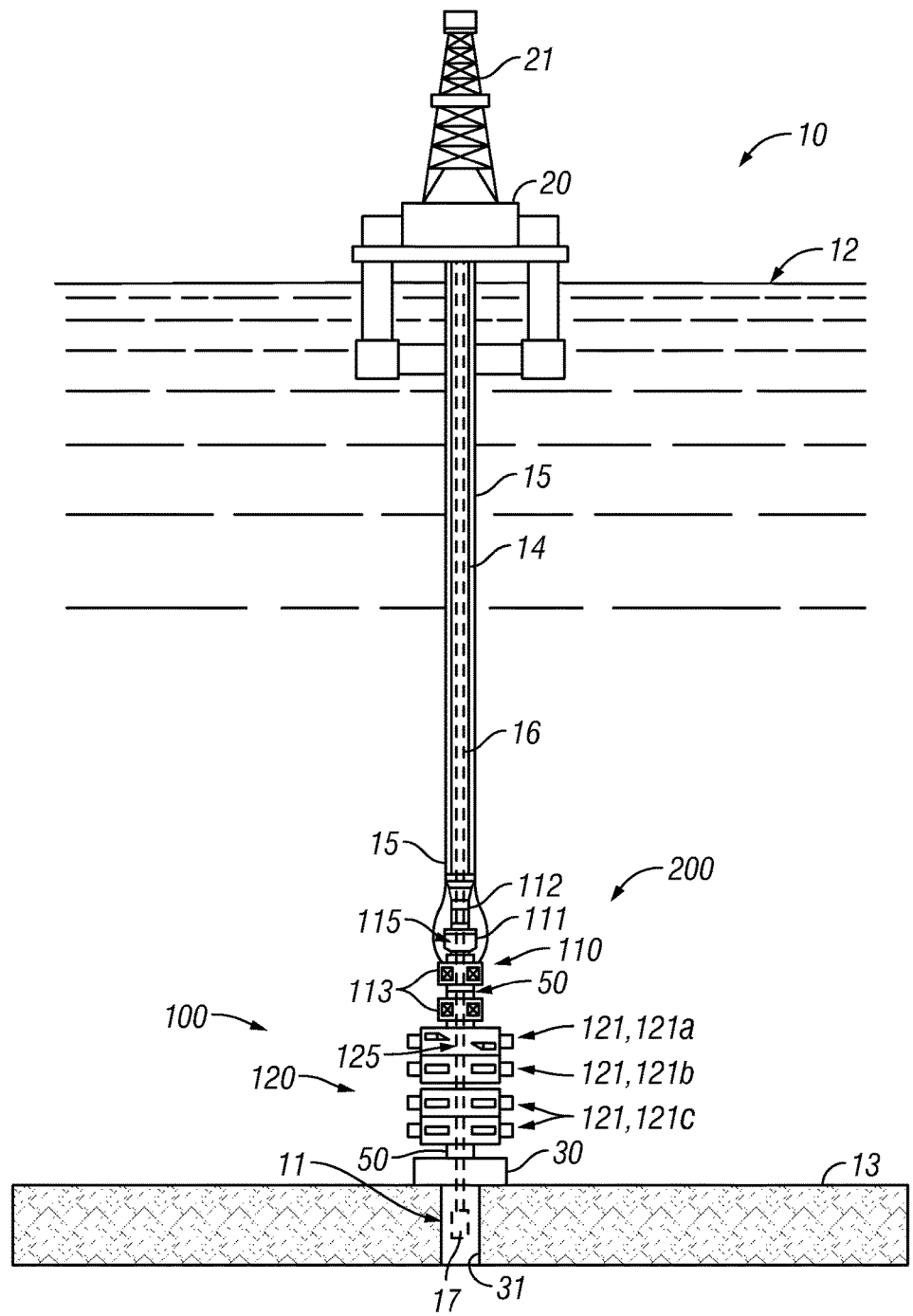
FIG. 1 shows a schematic view of an offshore system for drilling and/or producing a subterranean wellbore with an embodiment of a measurement system.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce the desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, an embodiment of an offshore system 10 for drilling and/or producing a wellbore 11 is shown. In this embodiment, the system 10 includes an offshore vessel or platform 20 at the sea surface 12 and a subsea BOP stack assembly 100 mounted to a wellhead 30 at the sea floor 13. The platform 20 is equipped with a derrick 21 that supports a hoist (not shown). A tubular drilling riser 14 extends from the platform 20 to the BOP stack assembly 100. The riser 14 returns drilling fluid or mud to the platform 20 during drilling operations. One or more hydraulic conduits 15 extend along the outside of the riser 14 from the platform 20 to the BOP stack assembly 100. The one or more hydraulic conduits 15 supply pressurized hydraulic fluid to the assembly 100. A casing 31 extends from the wellhead 30 into the subterranean wellbore 11.

Downhole operations are carried out by a tubular string 16 (e.g., drill string, tubing string, coiled tubing, etc.) that is supported by the derrick 21 and extends from the platform 20 through the riser 14, through the BOP stack assembly 100 and into the wellbore 11. A downhole tool 17 is connected to the lower end of the tubular string 16. In general, the downhole tool 17 may comprise any suitable downhole tools for drilling, completing, evaluating and/or producing the wellbore 11 including, without limitation, drill bits, packers, cementing tools, casing or tubing running tools, testing equipment, perforating guns, and the like. During downhole operations, the string 16, and hence the tool 17 coupled to it, may move axially, radially and/or rotationally relative to the riser 14 and the BOP stack assembly 100.

Figure 2:
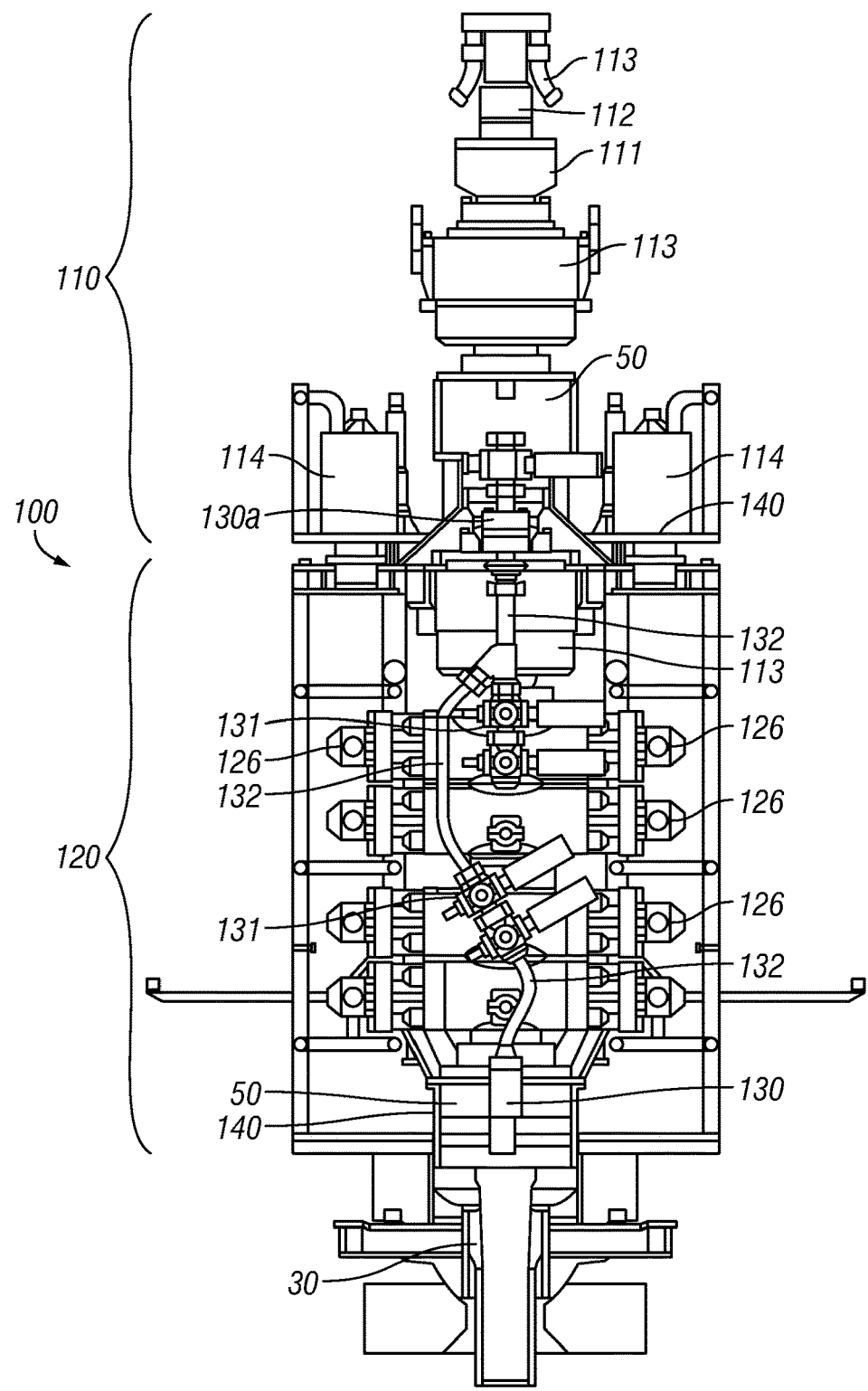
FIG. 2 shows an elevation view of the subsea BOP stack assembly and measurement system of FIG. 1.
Figure 3:
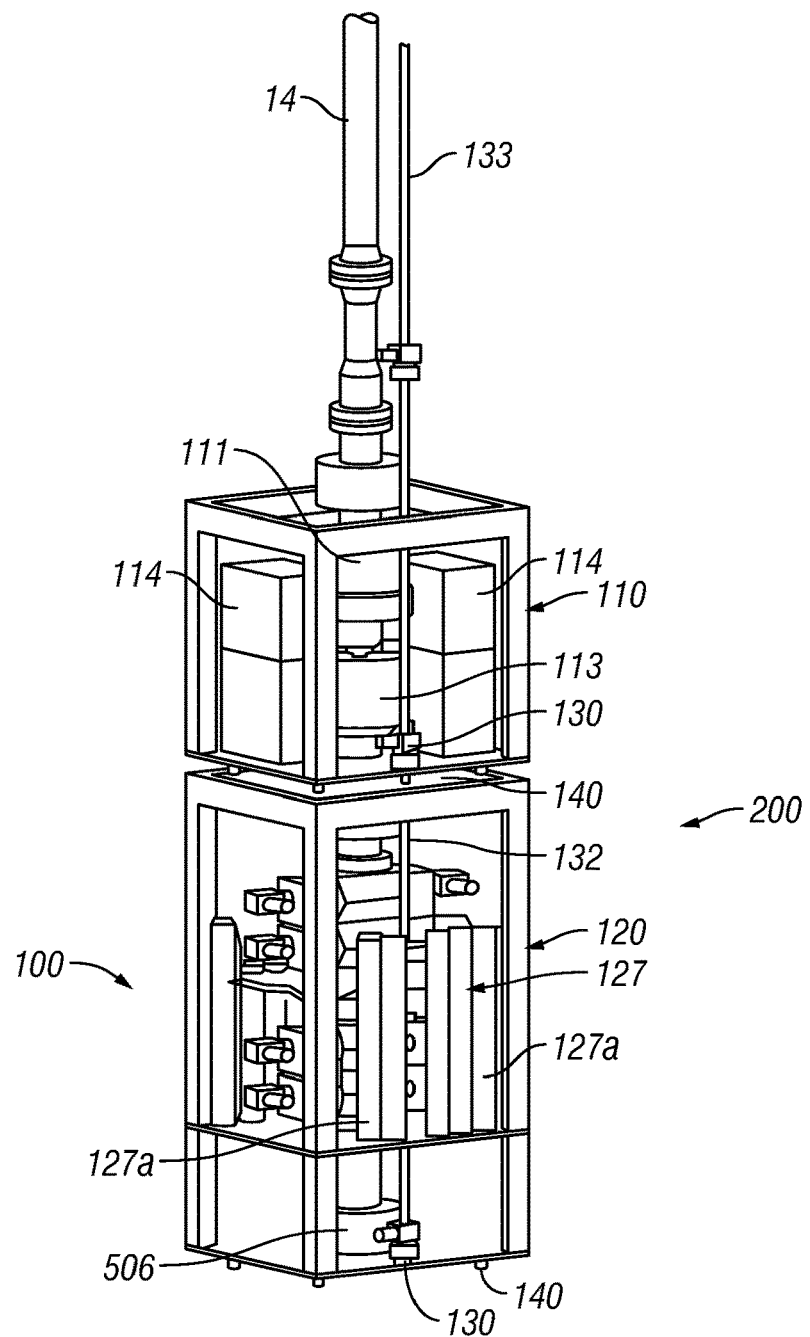
FIG. 3 shows a perspective view of the subsea BOP stack assembly and measurement system of FIGS. 1 and 2.

Referring now to FIGS. 1-3, the BOP stack assembly 100 is mounted to the wellhead 30 and is designed and configured to control and seal the wellbore 11, thereby reducing the likelihood of a release of undesired hydrocarbon fluids (i.e., liquids and gases) into the environment. In this embodiment, the BOP stack assembly 100 comprises a lower marine riser package (LMRP) 110 and a BOP or BOP stack 120. The BOP stack 120 is releasably secured to the wellhead 30 as well as the LMRP 110. The LMRP 110 is releasably secured to the BOP stack 120 and the riser 14.

In this embodiment, the BOP stack 120 comprises an annular BOP 113 as previously described, choke/kill valves 131 and choke/kill lines 132. A main bore 125 extends through the BOP stack 120. In addition, the BOP stack 120 includes a plurality of axially stacked ram BOPs 121. Each ram BOP 121 includes a pair of opposed rams (e.g., shear rams, blind rams, variable-bore rams) and a pair of actuators 126 that actuate and drive the matching rams. In other embodiments, the BOP stack 120 may include a different number of rams, different types of rams, one or more annular BOPs or combinations thereof. As will be described in more detail below, the control pods 114 operate the valves 131, the ram BOPs 121 and the annular BOPs 113 of the LMRP 110 and the BOP stack 120. The control pods may be located at the sea surface on the vessel, or subsea near or mounted to the BOP stack.

As shown in FIG. 3, the BOP stack 120 also includes a set or bank 127 of hydraulic accumulators 127a mounted on the BOP stack 120. While the primary hydraulic pressure supply is provided by the hydraulic conduits 15 extending along the riser 14, the accumulator bank 127 may be used to support operation of the rams 121a, c (i.e., supply hydraulic pressure to the actuators 126 that drive the rams 121a, c of the stack 120), the choke/kill valves 131, the connector 50b of the BOP stack 120 and the choke/kill connectors 130 of the BOP stack 120. As will be explained in more detail below, the accumulator bank 127 may serve as a backup means to provide hydraulic power to operate the rams 121a, c, the valves 131, the connector 50b, and the connectors 130 of the BOP stack 120. However, the accumulators could be designed to serve as the primary operators for the subsea equipment.

As previously described, in this embodiment, the BOP stack 120 includes one annular BOP 113 and four sets of rams (one set of shear rams 121a, and three sets of pipe rams 121c). However, in other embodiments, the BOP stack 120 may include different numbers of rams, different types of rams, different numbers of annular BOPs (e.g., annular BOP 113) or combinations thereof. Further, although the LMRP 110 is shown and described as including one annular BOP 113, in other embodiments, the LMRP (e.g., LMRP 110) may include a different number of annular BOPs (e.g., two sets of annular BOPs 113). Further, although the BOP stack 120 may be referred to as a "stack" because it contains a plurality of ram BOPs 121 in this embodiment, in other embodiments, BOP 120 may include only one ram BOP 121.

Figure 4:
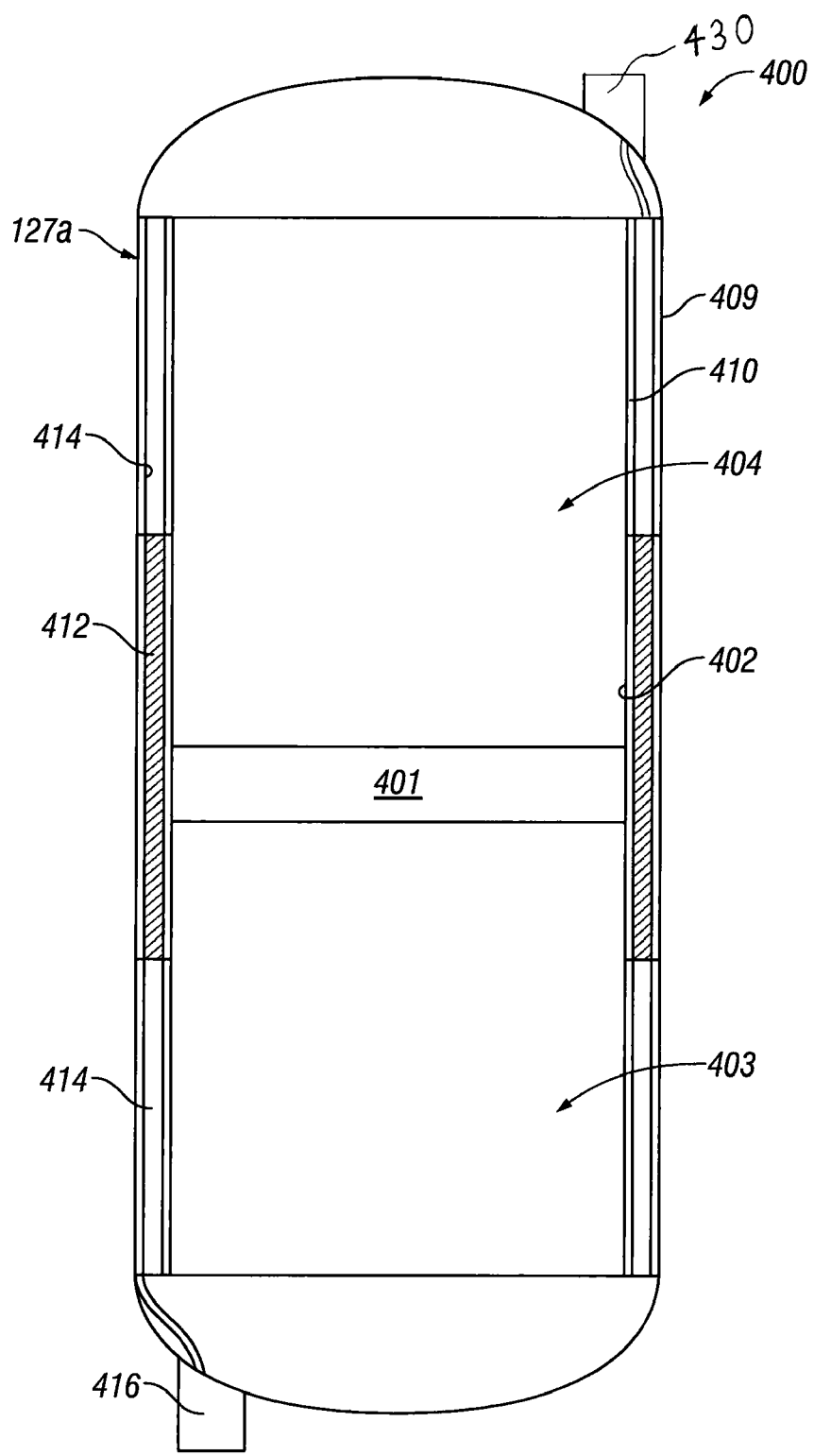
FIG. 4 shows a cross section view of an embodiment of a LVDT system for measuring the position of a movable element in a container.

A container and measurement system 400 are shown in FIG. 4. It should be appreciated by those of skill in the art that the container may be any type of container with an internal volume and an element movable within the internal volume (e.g., piston or bellows type accumulators). In the embodiment illustrated in FIG. 4, the container 420 is a hydraulic accumulator that includes an element 401 movable within its internal volume, or cavity, 402. The hydraulic accumulator 420 body is composed of an outer layer and an inner layer. The outer layer 409 of the accumulator 420 may include a metal, metal alloy and/or composite material (e.g., carbon fiber reinforced plastic). Composite materials are lighter than steel counterparts and possess high strength and stiffness, providing high performance in deep water, high pressure applications. The inner layer 410 of the accumulator 420 may include a metal and/or alloy.

In the embodiment in FIG. 4, the movable element 401 is a piston separating a hydraulic fluid 403 from a gas 404 stored in the internal volume of the accumulator 420. It should be appreciated by those of ordinary skill in the art that the movable element could be any device movable in an internal volume of a container that is capable of separating fluids. The piston 401 includes a magnetic core, including a magnetically permeable material, such as, for example, any magnetically permeable metal or alloy capable of inductively coupling with the excitation and output windings. The magnetic core of the piston 401 can constitute the entire piston, discrete surface areas of the piston, or any portion therebetween.

Referring again to FIG. 4, the accumulator 420 further includes a linear variable differential transformer ("LVDT") measurement system 400. The measurement system includes an excitation winding 412 centered between a pair of output windings 414 within the wall, or between the outer and inner walls, of the accumulator 420. In alternative embodiments, the windings may be positioned on the interior of the accumulator 420, on the exterior of the accumulator 420, or proximate to but not in physical contact with the accumulator 420. In the embodiment illustrated in FIG. 4, the output windings 414 are symmetrically and sequentially spaced about the excitation winding 412. In alternative embodiments, the excitation winding 412 and output windings 414 can be spaced concentrically with at least part of the exciting winding 412 and output winding 414 overlapping, or can have varying distances from the excitation winding.

A power source 416 is coupled to the excitation winding 412 and adapted to supply an excitation signal to the excitation winding. The power source supplies alternating current power at a constant amplitude. The power source may include signal conditioning equipment. The excitation winding 412 is inductively coupled with the piston 401 as a result of the excitation signal, thereby generating a magnetic flux. The magnetic flux is coupled by the piston 401 to the output windings 414. The piston 401 is movable along the longitudinal axis of the accumulator 420. If the piston 401 is half way between the output windings 414, equal magnetic flux is coupled to each output winding 414 so the voltage differential is zero. However, movement of the piston 401 along the longitudinal axis of the accumulator 420, and relative to the excitation winding 412 and the output windings 414, causes variations in the voltage differential across the output windings 414. The variations in the voltage across the output windings 414 results in output signals that are converted by a controller (430) into a measurement signal that is indicative of the position of the piston 401 within the accumulator 420.

In the illustrated system, the location of the piston 401 can be determined based on measuring the voltage differential between the output signals supplied from the output windings 414. The output signals supplied from the output winding 414 may be measured and analyzed by any device commonly understood in the art to measure such characteristics, such as current and/or voltage. For example, the system 400 may comprise a controller 430 that is coupled to the power source 416 and to the excitation and output windings. The controller 430 directs the power source to provide the excitation signal to the excitation winding. Subsequent movement of the piston changes the induced signals in the output windings, facilitating calculation of the piston's position by the controller 430. With a pair of windings, the differential voltage between the output windings is measured by the controller 430 which produces a measurement signal that is used by the controller 430 to calculate the position of the piston in the accumulator.

Figure 5:
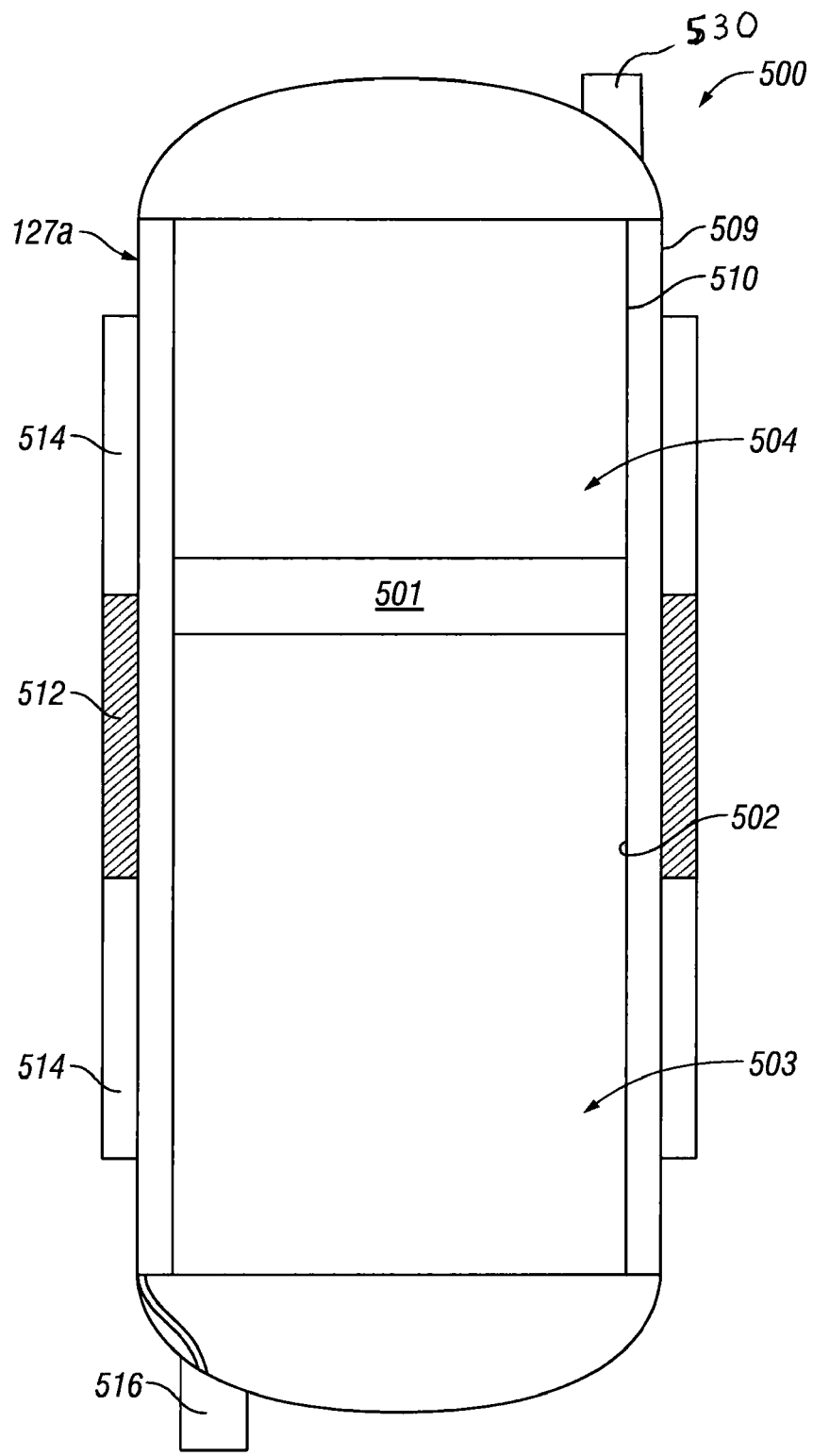
FIG. 5 shows a cross section view of another embodiment of a LVDT system for measuring the position of a movable element in a container.

A container and measurement system 500 are shown in FIG. 5. It should be appreciated by those of skill in the art that the container may be any type of container with an internal volume and an element movable within the internal volume. In the embodiment illustrated in FIG. 5, the container can be a hydraulic accumulator 520 that includes an element 501 movable within its internal volume, or cavity, 502. The hydraulic accumulator 520 body is composed of an outer layer and an inner layer. The outer layer 509 of the accumulators 520 may include a metal, metal alloy and/or composite material. Composite materials are lighter than steel counterparts and possess high strength and stiffness, providing high performance in deep water, high pressure applications. The inner layer 510 of the accumulator 520 may include a metal and/or metal alloy.

In the embodiment in FIG. 5, the movable element 501 is a piston separating a hydraulic fluid 503 from a gas 504 stored in the internal volumes of the accumulators 520. It should be appreciated by those of ordinary skill in the art that the movable element could be any device movable in an internal volume of a container that is capable of separating fluids. The piston 501 includes a magnetic core, including a magnetically permeable material, such as for example a metal. The magnetic core of the piston 501 can constitute the entire piston, discrete surface areas of the piston, or any portion therebetween.

The accumulator 520 further includes a linear variable differential transformer measurement system 500. The measurement system includes an excitation winding 512 which is centered between a pair of output windings 514 outside the outer layer 509 of the accumulator 520. In the embodiment illustrated in FIG. 5, the output windings 514 are symmetrically and sequentially spaced about the excitation winding 512. In alternative embodiments, the excitation winding 512 and output windings 514 can be spaced concentrically with at least part of the exciting winding 512 and output winding 514 overlapping.

A power source 516 is coupled to the excitation winding 512 and adapted to supply an excitation signal to the excitation winding. A controller 530 is coupled to the output windings. The piston 501 can be inductively coupled to the excitation winding 512 and/or the output windings 514 when the excitation winding 512 is in an excited state. In a particularly preferred embodiment, the piston 501 is inductively coupled to both the exciting winding and the output winding 514. The piston 501 is movable along the longitudinal axis of the accumulator 520. Movement of the piston 501 along the longitudinal axis of the accumulator 520, and relative to the exciting winding 512 and the output winding 514, causes variations in the output signals supplied from the output winding 514.

The location of the piston 501 can be determined based on measuring the output signals supplied from the output winding 514. The output signals supplied from the output winding 514 may be measured and analyzed by any device commonly understood in the art to measure such characteristics, such as current and/or voltage.

Figure 6:
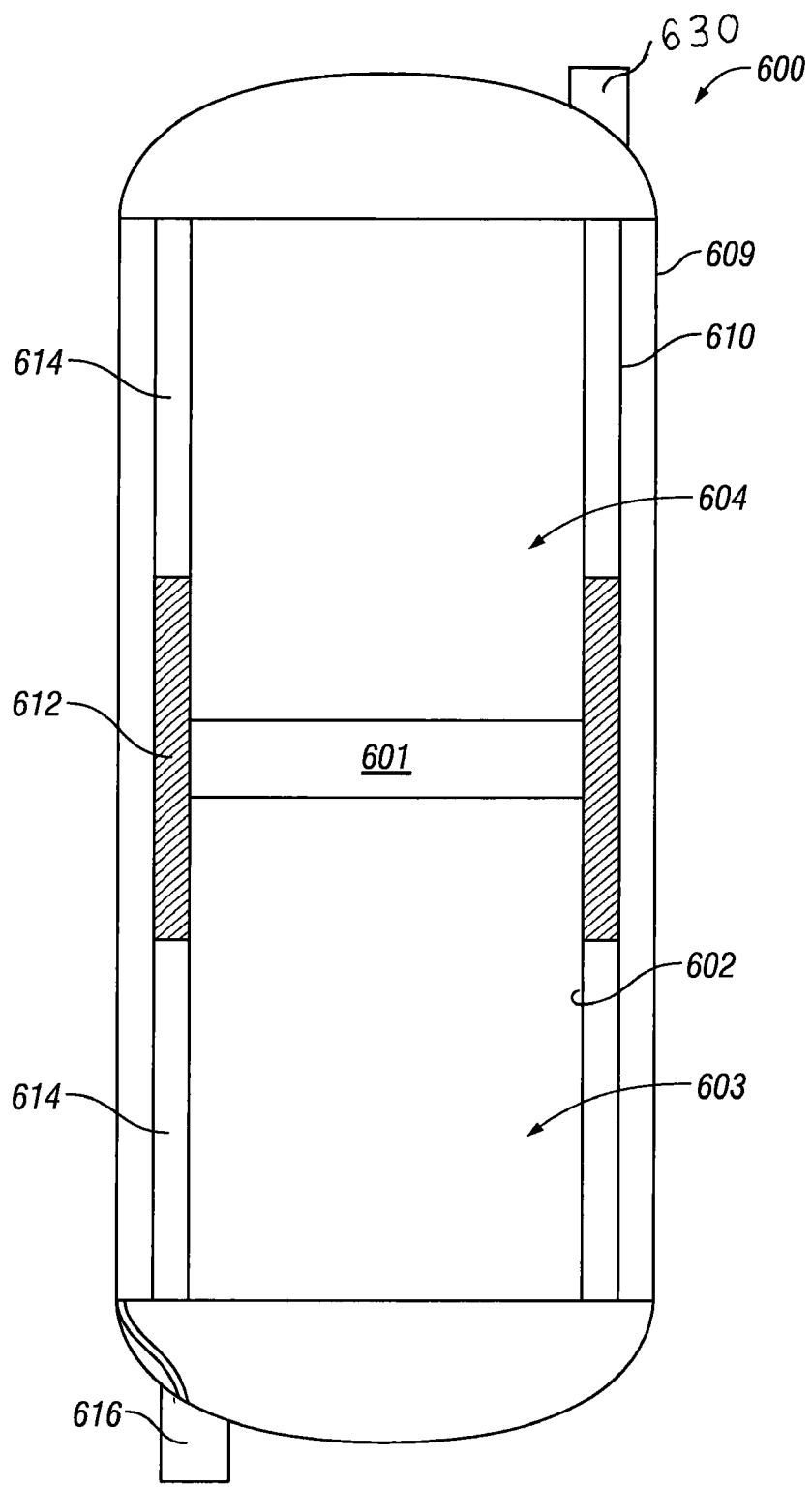
FIG. 6 shows a cross section view of another embodiment of a LVDT system for measuring the position of a movable element in a container.

A container and measurement system 600 are shown in FIG. 6. It should be appreciated by those of skill in the art that the containers may be any type of container with an internal volume and an element movable within the internal volume. In the embodiment illustrated in FIG. 6, the containers are hydraulic accumulators 620 that include an element 601 movable within their internal volume, or cavity, 602. The hydraulic accumulator 620 body is composed of an outer layer and an inner layer. The outer layer 609 of the accumulators 620 may include a metal, metal alloy and/or composite material. Composite materials are lighter than steel counterparts and possess high strength and stiffness, providing high performance in deep water, high pressure applications. The inner layer 610 of the accumulators 620 may include a metal and/or metal alloy.

In the embodiment in FIG. 6, the movable element 601 is a piston separating a hydraulic fluid 603 from a gas 604 stored in the internal volumes of the accumulators 620. It should be appreciated by those of ordinary skill in the art that the movable element could be any device movable in an internal volume of a container that is capable of separating fluids. The piston 601 includes a magnetic core, including a magnetically permeable material, such as for example a metal. The magnetic core of the piston 601 can constitute the entire piston, discrete surface areas of the piston, or any portion therebetween.

Referring again to FIG. 6, the accumulator 620 further includes a linear variable differential transformer measurement system 600. The measurement system includes an excitation winding 612 which is centered between a pair of output windings 614 inside the inner layer 610 of the accumulator 620. In the embodiment illustrated in FIG. 6, the output windings 614 are symmetrically and sequentially spaced about the excitation winding 612. In alternative embodiments, the excitation winding 612 and output windings 614 can be spaced concentrically with at least part of the exciting winding 612 and output winding 614 overlapping.

A power source 616 is coupled to the excitation winding 612 and adapted to supply an excitation signal to the excitation winding. A controller 630 is coupled to the output windings. The piston 601 can be inductively coupled to the excitation winding 612 and/or the output windings 614 when the excitation winding 612 is in an excited state. In a particularly preferred embodiment, the piston 601 is inductively coupled to both the exciting winding and the output winding 614. The piston 601 is movable along the longitudinal axis of the accumulator 620. Movement of the piston 601 along the longitudinal axis of the accumulator 620, and relative to the exciting winding 612 and the output winding 614, causes variations in the output signals supplied from the output winding 614.

The location of the piston 601 can be determined based on measuring the output signals supplied from the output winding 614. The output signals supplied from the output winding 614 may be measured and analyzed by any device commonly understood in the art to measure such characteristics, such as current and/or voltage.

Although the present invention has been described with respect to specific details, it is not intended that such details should be regarded as limitations on the scope of the invention, except to the extent that they are included in the accompanying claims.

What is claimed is:

1. An accumulator comprising:
   a housing;
   a movable element disposed in the housing, wherein the movable element is configured to separate a first fluid from a second fluid within an internal volume of the housing and comprises a magnetically permeable material; and
   a measurement system, comprising:
     an excitation winding excitable by an excitation signal to produce a magnetic flux and become inductively coupled to the moveable element; and
     output windings configured to be inductively coupled to the movable element upon excitation of the excitation winding to produce output signals such that the difference in the output signals is indicative of the position of the movable element;
   wherein the housing of the accumulator comprises an outer layer exposed to an external environment and an inner layer in contact with the first fluid and the second fluid, and the excitation winding and the output windings are disposed in a radially-extending space between the outer layer and the inner layer.

2. The accumulator of claim 1, further comprising a controller configured to receive the output signals and produce a measurement signal indicative of the position of the movable element.

3. The accumulator of claim 1, wherein the output windings and the excitation winding are disposed radially about the movable element.

4. The accumulator of claim 1, wherein a first output winding of the output windings circumferentially surrounds at least part of a first chamber that contains the first fluid within the internal volume of the housing, and a second output winding of the output windings circumferentially surrounds at least part of a second chamber that contains the second fluid within the internal volume of the housing.

5. The accumulator of claim 1, wherein the excitation winding and the output windings are concentrically disposed.

6. The accumulator of claim 1, wherein the excitation winding and the output windings are sequentially disposed.

7. The accumulator of claim 1, wherein the movable element comprises a piston movable within the internal volume of the housing of the accumulator, the first fluid comprises a pressurized gas, the second fluid comprises a hydraulic fluid, and the output windings produce the output signals in response to movement of the magnetically permeable material of the piston within the internal volume of the housing due to pressure from the pressurized gas on the piston as the hydraulic fluid is discharged from the internal volume of the housing to operate well equipment.

8. The accumulator of claim 1, wherein the movable element comprises a bellows movable within the internal volume of the housing of the accumulator.

9. The accumulator of claim 1, wherein the accumulator is a hydraulic fluid accumulator.

10. The accumulator of claim 9, wherein the second fluid comprises a hydraulic fluid, and the hydraulic fluid accumulator is connected to provide the hydraulic fluid to operate a blowout preventer.

11. The accumulator of claim 1, wherein the outer layer comprises at least one of a metal, metal alloy, and composite material.

12. A measurement system for measuring fluid volume in a subsea hydraulic accumulator capable of providing hydraulic fluid to power a blowout preventer, comprising:
   a piston movable within an internal volume of the accumulator, wherein the piston is configured to separate the hydraulic fluid from a second fluid, and the piston comprises a magnetically permeable material;
   an excitation winding excitable by an excitation signal to produce a magnetic flux and become inductively coupled to the piston;
   output windings configured to be inductively coupled to the piston upon excitation of the excitation winding to produce output signals such that the difference in the output signals is indicative of the position of the piston;
   a power source coupled and configured to supply the excitation signal to the excitation winding; and
   a controller configured to receive the output signals and produce a measurement signal indicative of the position of the piston based on the difference in the output signals;
   wherein the accumulator comprises a housing, an outer layer exposed to an external environment and an inner layer in contact with the first fluid and the second fluid, and the excitation winding and the output windings are disposed in a radially-extending space between the outer layer and the inner layer.

13. The measurement system of claim 12, wherein the excitation winding is disposed circumferentially about the internal volume of the accumulator.

14. The measurement system of claim 12, wherein the output windings are disposed circumferentially about the internal volume of the accumulator.

15. The measurement system of claim 12, wherein the excitation winding and the output winding are concentrically disposed.

16. The measurement system of claim 12, wherein the excitation winding and the output winding are sequentially disposed.

17. The measurement system of claim 12, wherein the second fluid comprises a pressurized gas, and the piston moves within the internal volume of the accumulator under pressure from the pressurized gas as the hydraulic fluid is discharged from the accumulator to operate the blowout preventer.

18. A method for determining a position of a piston configured to separate a first fluid from a second fluid within an internal volume of an accumulator, the method comprising:
   exciting an excitation winding disposed circumferentially about the piston within the internal volume of the accumulator to generate a magnetic flux;
   affecting the magnetic flux via movement of the piston within the internal volume of the accumulator, wherein the piston is inductively coupled to the excitation winding;
   coupling the magnetic flux to output windings disposed circumferentially about the internal volume of the accumulator; and
   measuring the voltage differential between the output windings to determine the position of the piston within the internal volume of the accumulator;
wherein the accumulator comprises a housing, an outer layer exposed to an external environment and an inner layer in contact with the first fluid and the second fluid, and the excitation winding and the output windings are disposed in a radially-extending space between the outer layer and the inner layer.

19. The method of claim 18, wherein the first fluid comprises a pressurized gas and the second fluid comprises a hydraulic fluid within the internal volume of the accumulator, and wherein affecting the magnetic flux with the position of the piston comprises moving the piston within the internal volume of the accumulator under pressure from the pressurized gas as the hydraulic fluid is discharged from the accumulator to operate a blowout preventer.

20. A blowout preventer stack comprising:
   one or more blowout preventers;
   one or more accumulators for providing hydraulic fluid to the one or more blowout preventers, each accumulator comprising a piston movable within an internal volume of the accumulator and configured to separate the hydraulic fluid from a second fluid within the internal volume of the accumulator, wherein at least one accumulator comprises a measurement system comprising:
      an excitation winding excitable by an excitation signal to produce a magnetic flux and become inductively coupled to the piston;
      output windings configured to be inductively coupled to the piston upon excitation of the excitation winding to produce output signals;
      a power source coupled to the excitation winding and adapted to supply the excitation signal to the excitation winding; and
      a sensor to measure the output signals supplied by the output windings, such that the difference in the output signals is indicative of the position of the piston;
      wherein the housing of the accumulator comprises an outer layer exposed to an external environment and an inner layer in contact with the first fluid and the second fluid, and the excitation winding and the output windings are disposed in a radially-extending space between the outer layer and the inner layer.

21. The blowout preventer stack of claim 20, further comprising a controller configured to receive the output signals and produce a measurement signal indicative of the position of the piston.

22. The blowout preventer stack of claim 20, wherein the output windings and the excitation winding are disposed radially about the piston.

23. The blowout preventer stack of claim 20, wherein the output windings are disposed circumferentially about the internal volume of the accumulator.

24. The blowout preventer stack of claim 20, wherein the excitation winding and the output windings are concentrically disposed.

25. The blowout preventer stack of claim 20, wherein the excitation winding and the output windings are sequentially disposed.

26. The blowout preventer stack of claim 20, wherein the outer layer comprises at least one of a metal, metal alloy, and composite material.

27. The blowout preventer stack of claim 20, wherein the piston comprises a magnetically permeable material, the second fluid comprises a pressurized gas, and the piston moves within the internal volume of the accumulator under pressure from the pressurized gas as the hydraulic fluid is discharged from the accumulator to operate the one or more blowout preventers.

28. The blowout preventer stack of claim 27, wherein the excitation winding and the output windings are coupled to a housing of the accumulator that defines the internal volume of the accumulator, a first output winding of the output windings circumferentially surrounds at least part of a pressurized gas chamber that contains the pressurized gas within the internal volume, and a second output winding of the output windings circumferentially surrounds at least part of a hydraulic fluid chamber that contains the hydraulic fluid within the internal volume.

* * * * *